Oct. 27, 1936.　　　J. M. SILVER　　　2,058,836
COLLAPSIBLE GRILL AND CAMP STOVE
Filed June 17, 1935　　2 Sheets-Sheet 1
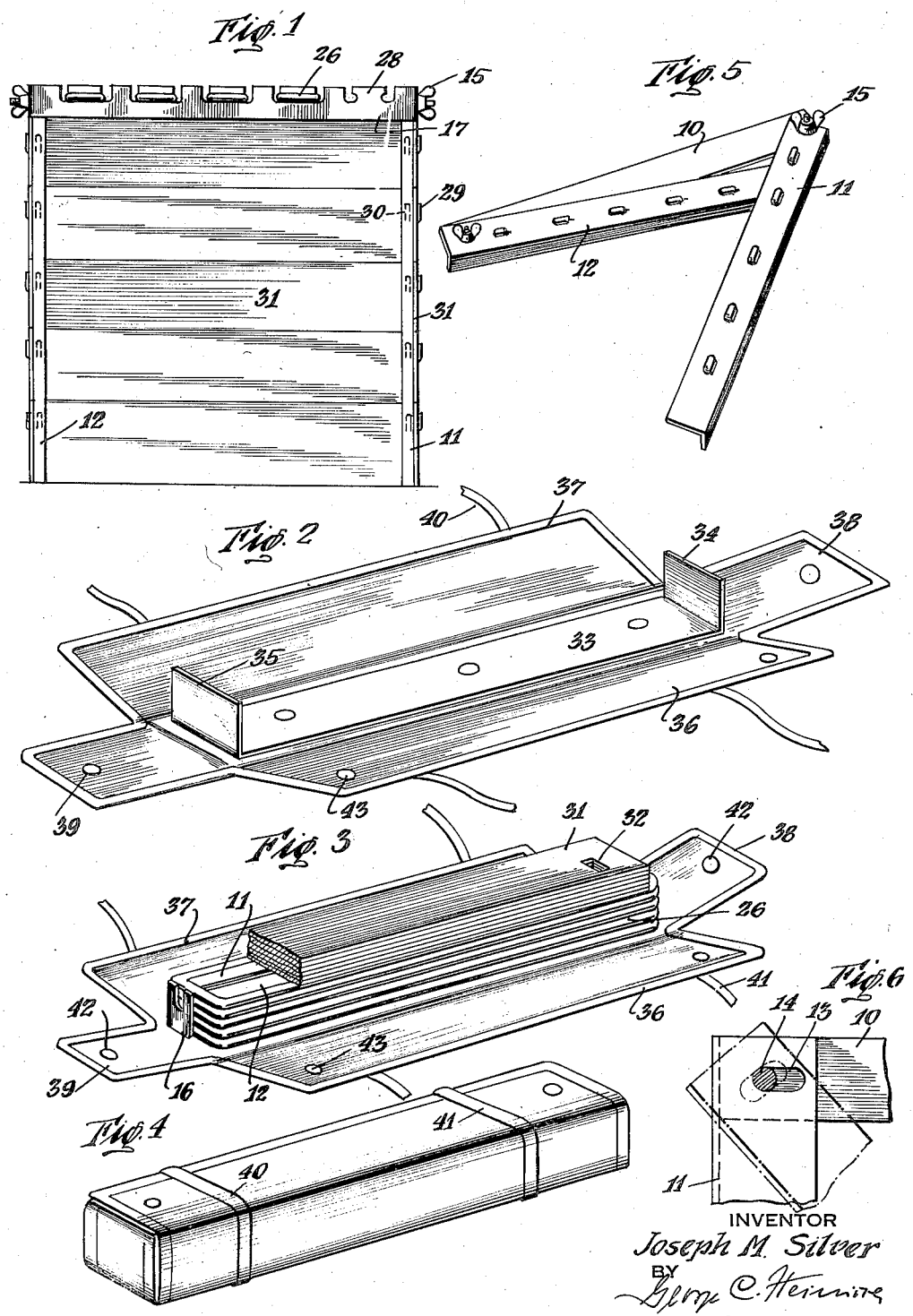

Oct. 27, 1936.  J. M. SILVER  2,058,836
COLLAPSIBLE GRILL AND CAMP STOVE
Filed June 17, 1935  2 Sheets-Sheet 2
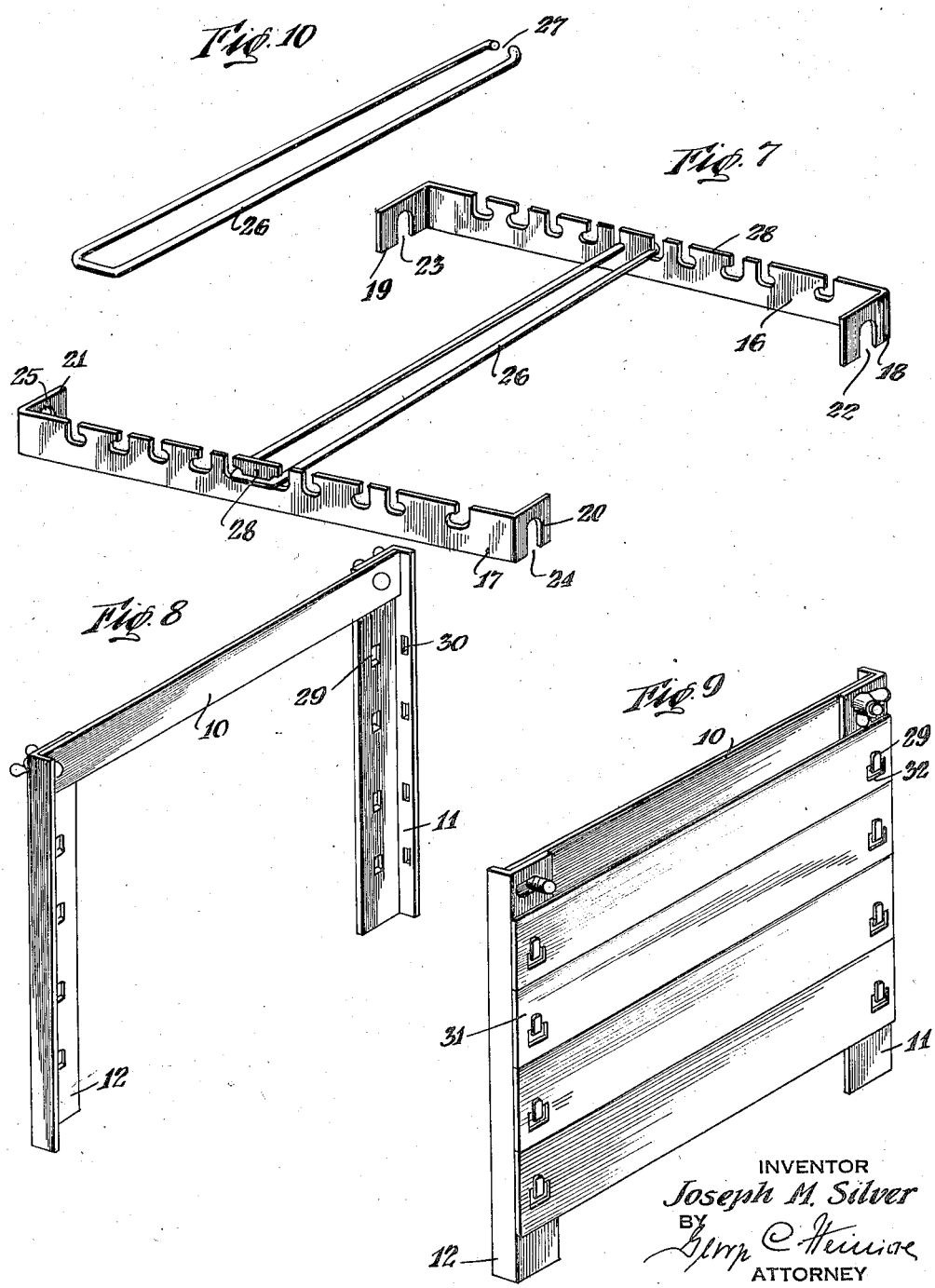
INVENTOR
Joseph M. Silver
BY
ATTORNEY Patented Oct. 27, 1936

2,058,836

UNITED STATES PATENT OFFICE 2,058,836

COLLAPSIBLE GRILL AND CAMP STOVE

Joseph M. Silver, New York, N. Y.

Application June 17, 1935, Serial No. 26,939

5 Claims. (Cl. 126—29)

This invention relates to a collapsible grill and camp stove, and it is the principal object of my invention to provide such an article which, when not in use can be folded into the smallest possible compass for convenient transportation within an appropriate casing.

Another object of my invention is the provision of a collapsible grill and camp stove the single or individual parts of which are interconnected in such manner that screw bolts are so displaceable in elongated oval openings in the leg parts so as to unite the same with the end pieces of the grill for convenient folding against one another, said bolts adapted to receive the suitably recessed angular ends of the side bars so that by the screwing home of suitable wing nuts, the legs, end pieces and side bars form a set up frame which is perfectly stable and secure against swaying.

A further object of my invention is the provision of a collapsible grill, the grill bars of which have the form of strong wire loops open at one end and adapted to be inserted into suitably shouldered recesses in the upper edges of the side bars and to be held therein by the resiliency of the wire loops, so as to form a grill suited for cooking and roasting.

A still further object of my invention is the provision of a collapsible grill and camp stove the legs of the frame thereof equipped with properly shaped tongues for the suspension of wind-shields to protect the fire against drafts, and wind storms.

Further objects of my invention are the provision of a suitable casing for the collapsed grill equipped with means for holding and supporting the parts in their demounted state securely in their relative positions so as to form a very small package, an outer folding wrapper being provided to enclose the entire collapsed grill and camp stove.

These and other objects and advantages of my invention will become more fully known as the description thereof proceeds, and will then be specifically defined in the appended claims.

In the accompanying drawings forming a material part of this disclosure:

Fig. 1 is a side elevation of a collapsible grill and camp stove constructed according to my invention, set up.

Fig. 2 is a perspective view of a wrapper into which the parts of the collapsed grill are to be folded.

Fig. 3 is a perspective view of the wrapper with the parts of the collapsed grill in position therein.

Fig. 4 is a perspective view of the compact parcel into which the collapsible grill is folded for convenient transport.

Fig. 5 illustrates in perspective view the folding of the end pieces and legs.

Fig. 6 is a detail inner view of one of the corners of the grill with one of the legs, one of the end pieces, and one of the side bars shown fragmentarily in the process of folding.

Fig. 7 shows in perspective view the two grill bars supporting side bar members with the grill bar in position thereon, as an example of the means for holding the grill bars.

Fig. 8 is an inner view of one end member set up.

Fig. 9 is an outer view of one of the end members with the wind shields in position on the legs thereof.

Fig. 10 is a detail view of one of the grill bars.

As illustrated, the grill and camp stove according to my invention comprises the end pieces or flat bars 10 to the ends of which are attached the inner ends of a pair of upstanding parallel legs 11, 12, substantially L-shaped in cross-section, and having elongated or oval holes 13 formed in their wider branches of the L through which extend the screw bolts 14 carrying at their outer ends wing nuts 15 or the like.

The side bars 16, 17 forming the upper frame part of the grill have each rectangularly bent, inwardly directed ends 18, 19 and 20, 21 respectively provided with recesses 22, 23 and 24, 25 respectively in their lower end edges adapted to be engaged with or by the shanks of the screws 14 when the grill is assembled and to be held in place and in engagement with the outer end faces of the endpieces when the wing nuts are screwed home, as indicated at 15.

The grate bars proper, 26, consist each of a strong wire loop open at one end, as at 27, to be clamped about the substantially T-shaped heads 28 formed by the recesses in the upper edges of the side bars, as best shown in Figure 7.

The outer faces of the pairs of legs 11, 12 are provided with tongues bent out of the plane of the legs and designated 29, 30, and serving the purpose of engaging in suitable openings 32 near the ends of windshield plates 31.

The package or wrapper into which the parts of the collapsed grill are to be stored is made of substantially pliable material and has a metal bottomplate 33 with angularly disposed upstanding end lugs 34, 35, and side flaps of the wrapper designated 36, 37 co-operate with end flaps 38, 39 of the material of the wrapper to cover the collapsed grill parts. The end flaps are provided with suitable buttons 42 on their inner faces adapted to engage suitable sockets 43 on the outer face of one of the side flaps when the wrapper is about to be closed over the grill parts, while bands 40, 41 on the outer face of side flaps 36, 37 hold the wrapper closed.

In operation, the legs are unfolded and set up with the end pieces unfolding about their hinge bolts which will readily allow this on account of their being carried with play in the oval slots of the legs. When the recesses in the angular ends of the side bars are engaged with the bolt shanks, and the wing nuts are screwed home, the legs, end pieces and side bars will form a rigid frame supported by the legs. Then the grate bar wire loops are introduced through the recesses at the sides of the T-pieces until their closed ends engage the outer faces of the side bars while their opposite open ends clampingly engage the stems of the T-pieces on the opposite side bar, so as to form a firm grill. When now the windshields are hung properly upon the tongues of the respective legs according to the direction of the wind, the grill and stove is completely set up for use. The demounting of the parts is effected in the reversed order of these steps, and then the grate bars are piled upon the base plate of the wrapper between the upstanding endpieces thereof, the legs are folded against the end pieces and will form a perfectly smooth engagement on account of the play of the bolts within the oval slots of the legs. Legs and end pieces are then placed within the trough-shaped chamber formed by the superposed grill or grate bars, and the side bars are then placed against the outsides of the trough with their angular bent ends engaging the ends of the trough. If now the windshields are placed upon the top of the trough and end flaps are engaged with the side flap of the wrapper having the sockets, and the other side flap is laid over the whole and the bands are knotted, the entire structure will form a compact whole easily to be handled and stored for transportation in a knapsack or the like.

It will be understood that I have disclosed the preferred form of my invention only as one example of the many possible ways to practically construct the same, and that I may make such changes in the general arrangement and in the construction of the minor details of my invention, as come within the scope of the appended claims without departing from the spirit of my invention and the principles involved.

Having thus described my invention, what I claim as new and desire to protect by Letters Patent is:

1. A collapsible grill and camp stove comprising a frame composed of horizontally extending end members, and upright pairs of legs movably secured at their upper ends to the ends of each end member to permit folding of a pair of legs and an end member against one another, side bars horizontally extending and engaging the upper ends of said legs, means to clamp all of the frame parts firmly together, a grate formed of removable grill bars supported by said frame members, and a plurality of shield members arranged in superposed relation and supported by said frame members and removably held to a pair of said legs, said frame members, shield members and grill bars equally being proportioned in length and width for the purpose of putting them compactly into a package, said shield members protecting the stove-fire against the wind.

2. A collapsible grate and camp stove comprising a frame composed of legs provided with oval or elongated slots, horizontally extending end members equipped with screw bolts extending through said slots, said legs upstanding and arranged in pairs and movably secured at their upper ends to the ends of an end member to permit folding of a pair of legs and an end member against one another, and side bars horizontally extending and engaging the upper ends of said legs and having recesses for the reception of the shanks of said screw bolts, means to clamp said legs, and members and side bars together at the corners of the set up frame, and grate bars removably supported on said frame, and a plurality of shield members arranged in superposed relation and removably held to a pair of said legs to protect the stove fire against the wind, said frame members, shield members and grate bars being equally proportioned in length and width so, when dismounted, they may be compactly placed into a package, and means to secure said windshield members to the frame.

3. A collapsible grill and camp stove comprising horizontally extending end members and upright pairs of legs substantially L-shaped in cross section, and pivotally and loosely secured at their upper ends to the ends of an end member to permit folding of a pair of legs and an end member against one another, said legs provided with oval and longitudinally extending openings near their upper ends, screw bolts carried by said end members and horizontally extending through said openings in said legs, and side bars horizontally extending and engaging the upper ends of said legs and having angularly bent, recessed ends to straddle the shanks of said screw bolts and engaging said end members, wing nuts on said bolts to clamp the parts together when assembled to constitute a solid frame, grate bars removably supported by said side bars, and a plurality of windshield members arranged in superposed relation and removably held to a pair of said legs to protect the stove fire against the wind, said end members, side members, windshield members, legs and grate bars being equally proportioned in length and width for the purpose of compactly storing all parts of the grill in a package.

4. In a collapsible grill and camp stove, a frame, a pair of horizontally opposed side bars for said frame having substantially T-shaped heads formed in the upper edge portions thereof and spaced from one another, grate bars of resilient wire loops, each loop being open at one end and having opposite side portions of the loop sprung into position around the vertical portion and beneath the top portion of opposing T-shaped heads.

5. In a collapsible grill and camp stove, legs, tongues formed with said legs and bent out of the plane of said legs, and windshield members supported by said tongues in an appropriate superposed number on the side of the stove exposed to the wind to protect the stove-fire, said windshield members and legs of the grill and stove being equally proportioned in length and width for the purpose of putting them compactly in a package.

JOSEPH M. SILVER.